INFORMATION STORAGE SYSTEM

Filed May 19, 1953 2 Sheets-Sheet 1

INVENTOR
HARRY KENOSIAN
BY
Laurence R. Brown
ATTORNEY

INFORMATION STORAGE SYSTEM

Filed May 19, 1953 2 Sheets-Sheet 2

INVENTOR
HARRY KENOSIAN
BY
Laurence R. Brown
ATTORNEY

United States Patent Office 2,796,596

Patented June 18, 1957

2,796,596

INFORMATION STORAGE SYSTEM

Harry Kenosian, Upper Darby, Pa., assignor to Burroughs Corporation, Detroit, Mich., a corporation of Michigan Application May 19, 1953, Serial No. 355,929

11 Claims. (Cl. 340—174)

This invention relates to decimal storage systems and more particularly to systems of the type providing recording media with at least two lanes respectively having numerical information and related timing signals recorded therein.

Such recording media may, for example, include magnetic drums, or the like. A lower pulse resolution limit is reached in any such medium so that it is difficult to distinguish with associated detectors two closely spaced numerical signals. This has limited the available storage space in prior art systems.

It has been found that the positioning of discrete pulses, however, may be readily distinguished. More efficient storage capacity is afforded by the present invention therefore in a system distinguishing stored numerical data by the related time spacing of two signals, which may be stored in two separate lanes.

Because of the propensity of storage media for two stable states it has, in the past, been desirable to utilize binary coded decimal systems. In such systems decimal to binary converters must be used for interpreting information at the input and output sections. It has generally been possible to provide more efficient storage of binary numbers than decimal numbers. In accordance with the present invention, however, direct decimal storage is provided and the storage efficiency is nevertheless increased in addition to simplification of associated circuitry for performing arithmetic operations.

It is therefore a general object of the invention to provide improved arithmetic storage systems.

It is another object of the invention to provide high storage capacity in recording media such as magnetic drums.

Further it is an object of the invention to provide more efficient arithmetic systems by operating directly with decimal arithmetic.

It is a still further object of the invention to provide a storage system wherein numbers are identified by time space discrimination between stored information in two recording lanes or tracks.

In accordance with a specific embodiment of the invention a magnetic drum is provided with timing and digital record tracks wherein the pulse information in each track is recorded far enough apart in time ($\Delta T$) that adjacent pulses may be distinguished. The time spacing between related signals on the two tracks is chosen to identify a suitable decimal number. An auxiliary timing pulse generator external to the storage medium (and therefore capable of higher pulse resolution) divides the time interval between recorded timing pules into ten increments. A gating circuit operable in response to the time spacing between signals on the two tracks is utilized to gate out the number of auxiliary timing pulses corresponding to the decimal number stored in the digital track. Therefore direct operations may be readily provided in any suitable pulse operated decimal arithmetic unit, without code conversion.

Other objects and features of advantage will be found hereinafter throughout both the specification and accompanying drawing; in which.

Figures 1, 2:
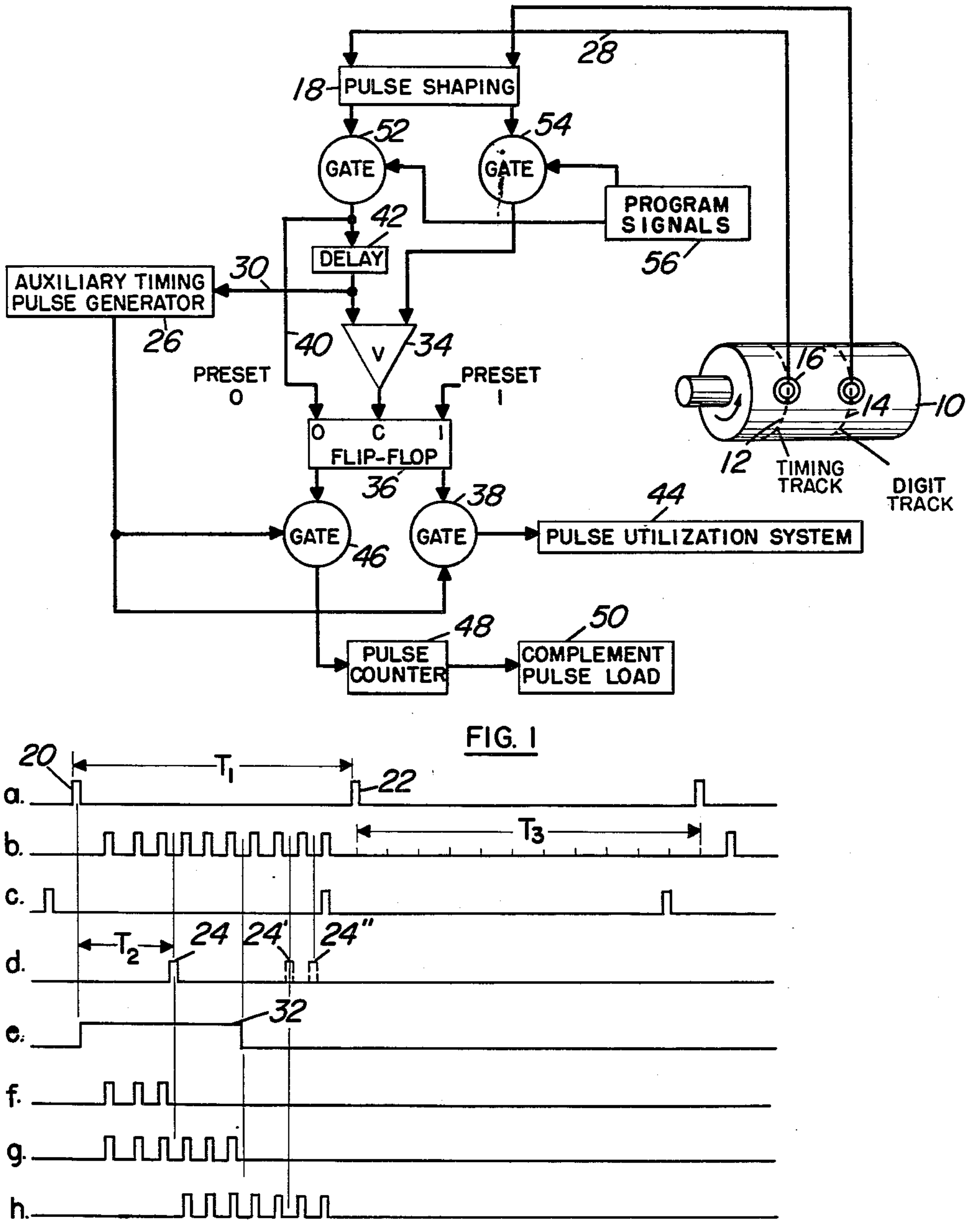
Fig. 1 is a block diagram of a decimal storage system constructed in accordance with the teachings of the present invention.
Fig. 2 is a waveform chart illustrating certain operational features of the invention.

Throughout the drawing, like reference characters will be used to designate similar circuit components in order to facilitate comparison. Those circuits which are commercially available and well known to those skilled in the art, and whose details are not part of the present invention, are shown only in block diagram form to more readily point out the nature and organization of the invention. The invention is illustrated by a specific embodiment; but it is to be recognized that modifications will be immediately suggested to those skilled in the art which do not depart from the spirit and scope of the invention. For example, numbers with a radix other than ten may be represented in a similar manner, and storage media affording the same resolution problems as recorded magnetic drums and signals other than pulses may be used.

For a teaching of the organization of the invention, reference is made to Figs. 1 and 2. The storage medium shown is a conventional magnetic drum 10 having both timing and digital signal tracks 12 and 14 upon which are recorded a series of indexed signals. Each arithmetic digit is positioned to correspond to the location of an associated timing signal. The timing signals may comprise discrete pulses located as closely together as possible in order to be detected with the magnetic head 16. Signals reproduced from the timing track by the magnetic head 16 may be transformed by the pulse shaping circuit 18 to pulses of the form shown in Fig. 2*a*, wherein the time interval $T_1$ represents the minimum spacing between adjacent recorded pulses. Such pulses may be derived, for example, by detecting the flux change of each discrete pulse, and processing the detected flux change to provide the desired signal waveform. It is readily recognized that if two pulses are too closely spaced they will merge and a separate flux change of the second pulse can not be distinguished, thereby necessitating some minimum time interval $T_1$ between adjacent pulses. Because of this effect, the pulse packing density in the storage medium is lower than might be desirable. However, detection of the flux change of the discrete pulses and separation thereof by relatively large spacing intervals as indicated by the waveform pulses 20 and 22 in Fig. 2*a* is readily accomplished. In this manner the position of the pulses upon the record track is identified with high precision. Signal pulses 24 as shown in the waveform of Fig. 2*d* thereby may be precisely spaced on the digit track 14 at any desired position inetrmediate to two successive timing pulses 20 and 22.

The pulse resolution in storage media such as magnetic drums is generally much lower than that available with other types of readily available electronic equipment. Thus, an auxiliary timing pulse generator 26 may be utilized to generate a plurality of pulses in between two successive timing pulse as shown in the waveform of Fig. 2*d*. The auxiliary timing pulse generator might comprise for example, an oscillator circuit synchronized with the timing pulse upon the magnetic drum, or other embodiments as will be later described in connection with Figs. 3 and 4.

It may be assumed without immediately discussing the intermediate circuitry that timing pulses from the drum timing track 12 pass along lead 28 and arrive at the auxiliary timing pulse generator 26 by way of lead 30 to effect synchronization of the auxiliary timing pulses with the timing pulses on the drum. As before explained, any desired time spacing such as $T_2$ may be provided between corresponding signals respectively located upon the timing and digit tracks of the magnetic drum 10. In considering the relationship of the different waveforms of Fig. 2, it is noted that the digit signal 24 (Fig. 2*d*) designates the decimal number 3 as indicated by the output pulses of Fig. 2*f* since three of the ten auxiliary timing pulses occur between the preceding timing pulse 20 and the digital pulse 24. Should the digital pulse be alternatively located as shown in the dotted positions 24′ or 24″ however, it would rather designate the decimal numbers 8 or 9. Conversely, the number of pulses located between the digital pulse 24 and the succeeding adjacent timing pulse 22 would represent the complement of the decimal number or the number seven as indicated by the pulses of the output waveform in Figure 2*h*.

It is readily seen therefore that by spacing the respective numerical and timing signals in time sequence in the different storage tracks, that the time spacing between the signals may be used to directly identify the decimal number without increasing the storage resolution available with the drum. Since it is necessary to represent a decimal number in binary code with four binary digits, it is easily seen that this direct storage means highly increases the drum capacity while simultaneously affording extreme advantage in that decimal arithmetic methods may be used directly. By gating the auxiliary timing signals occurring during the space interval between corresponding signals stored in the two storage tracks, any pulse responsive decimal arithmetic utilization system may be directly actuated without the necessity of intervening code conversion units.

Since the minimum resolution time increment is represented by the interval $T_1$, successive digital pulses positioned say in positions corresponding to numbers eight and two respectively could not be distinguished. It therefore becomes necessary in identifying successive decimal numbers to separate successive signals by a spaced distance of at least an integral increment of $T_1$ as indicated by the spacing $T_3$ of Fig. 2*b*. The spacing is obviously not critical but for maximum information storage capacity, the spacing is made no longer than the necessary spacing $T_1$. It is noted that the storage capacity of the drum is increased to twice the binary storage value since only two pulse intervals are used in this system for providing a decimal number, whereas four pulses are necessary to express the same number in binary coded decimal, which requires four pulse intervals.

As shown in the waveform of Fig. 2*e* separate excursions for each stored pulse of digital information are not necessary in the present system. Thus a single variable length pulse 32 may be used. The length of the illustrative waveform 32 identifies the decimal number 6 as shown in the output waveform of Fig. 2*g*, since it subtends six of the auxiliary timing pulses.

In Fig. 1, means is provided responsive to signals in the digital track 14 for selectively gating those auxiliary timing signals corresponding to the number recorded. Such means includes the mixer circuit 34, the bistable state flip-flop circuit 36, and the gate circuit 38. The mixer circuit 34 is connected to pass pulses from either the timing track 12 or digit track 14 to the complementing terminal C of the flip-flop circuit 36, so that the flip-flop circuit alternately changes from one state to the other responsive to successive signals from either of the tracks. The flip-flop circuit 36 may be preset in either desired position depending upon whether the recorded number is desired at the utilization circuit 44 or its complement.

Automatic preset may be obtained by means as shown in the drawing, wherein the waveform of Fig. 2*c* is derived from the timing pulses to preset the flip flop circuit 36 into the zero position by way of lead 40 before the timing pulses are effective in causing the synchronized auxiliary timing pulses to be generated. In this instance, the flip flop circuit 36 is preset to its "0" state by the timing pulse before its delay in delay unit 42. This causes the flip flop circuit 36 to attain its "1" output state with response to the timing pulse arriving at the complement input terminal C and to prime gate 38 for passing the auxiliary timing pulses from the pulse generator 26 to the pulse utilization system 44, which might for example be a decimal arithmetic unit. The next pulse to arrive at the mixer circuit 34 and therefore the flip flop input terminal C is the digital pulse 24, which returns the flip flop circuit to its "0" state thereby closing the gate 38 and assuring that the number of auxiliary timing pulses gated corresponds to the number recorded on the digit track 14. Alternatively if the flip flop circuit 36 were initially preset in its "1" state, the complement of the recorded number would be gated by circuit 38.

It is readily seen that an auxiliary gate circuit 46 primed by the flip flop circuit 36 when in the "0" state will serve to gate out the complement of the number passed by gate 38. Thus, a pulse counter circuit 48 may serve to store the result or modify it for use in the complement pulse load circuit 50, if desired. It is to be recognized by those skilled in the art that the availability of both a number and its complement is of advantage when performing addition and subtraction, and that any suitable arithmetic utilization circuits may be driven from the disclosed system with advantage.

In order to selectively gate the digital information in accordance with a desired program, gate circuits 52 and 54 may be inserted respectively in the signal transfer path between the timing and digit track and the mixer circuit 34 so that any information may be selectively gated out by means of the programming signal circuit 56.

Figure 3:
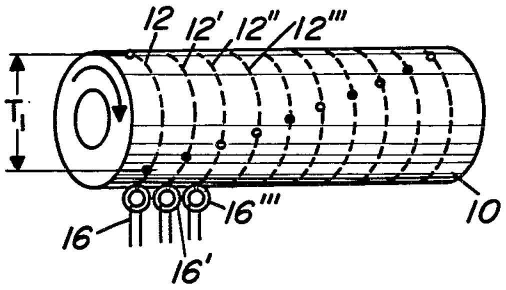
Figs. 3 and 4 are different types of auxiliary timing pulse generators operated in synchronism with timing pulses on a storage track.

If desired, the auxiliary timing pulses may be provided in synchronism with the timing pulses upon the recorded track 12 by medium of auxiliary timing tracks on the drum 10, as shown in Fig. 3. Either by means of staggering the stored signals represented by the small circles in the auxiliary timing tracks 12′ etc., or by staggering the magnetic heads 16′ etc., when the signals are in line the desired plurality of auxiliary timing pulses may be generated in proper time relationship during the time interval $T_1$. In this case successive pulses recorded on both the main timing track 12 and each of the timing tracks 12′ etc. are spaced by the same time interval $T_1$, and each timing track has the pulses delayed in time from those on another track. The timing pulses may be mixed in a conventional circuit to provide the desired group of signals.

Figure 4:
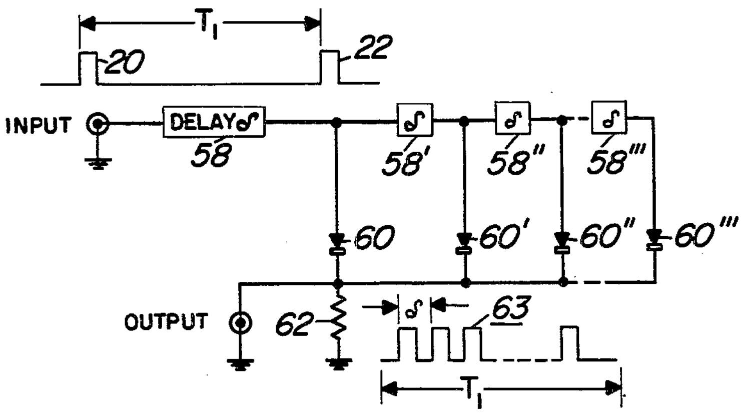

Another suitable means of obtaining the auxiliary timing pulses is shown in Fig. 4. Thus, a plurality of cascaded delay units 58 is provided to which pulses from the timing track may be inserted. Output pulses from each of the delay units are then mixed by means of diodes 60 and output impedance 62 to provide the desired number of auxiliary timing pulses during the time interval $T_1$ from a single input timing pulse as shown in the output waveform 63.

Figure 5:
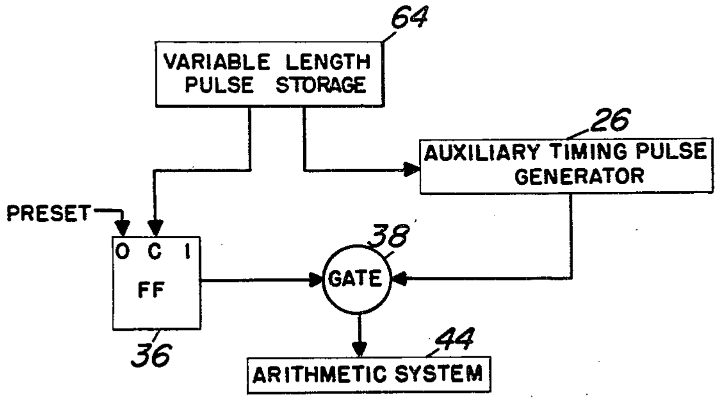
Fig. 5 is a storage system constructed in accordance with a further phase of the invention.

As described hereinbefore other types of stored signals may be utilized with a system as shown in Fig. 5. The storage unit 64 may comprise a magnetic drum of the type described, if desired. Auxiliary timing pulses from generator 26 are gated in the same manner to an arithmetic utilization system 44 by means of flip flop circuit 36, which in this embodiment is designed to alternately change its output state in response to the leading and trailing edges of the variable width waveform 32 of Fig. 2*e*, and provide the output pulses of Fig. 2*g*. Should enough energy be available directly from the storage device 64, the gate 38 could be directly primed by the variable duration signal to effect the same result.

It is clear from the foregoing description of the invention and its operation that improvements have been made permitting both more efficient storage to be accomplished and decimal arithmetic to be directly performed. Those novel features of the invention believed descriptive of the nature of the invention are described with particularity in the appended claims.

What is claimed is:

1. In a system having discrete digital impulses recorded upon a movable magnetic body wherein the pulse definition permits two separate identifiable signals to be displaced by an increment represented by a time $\Delta T$ when the body is moved at substantialy constant speed, timing signals being recorded upon said body in a recorded timing track with a periodic recurrence time of substantially $\Delta T$, the combination comprising, means external to said track for generating a plurality of auxiliary timing pulses occurring intermediate two of the timing pulses upon said track, a digital signal track upon said body having intelligible signal pulses time spaced between two of said timing pulses on the timing track, and means connected to count the number of auxiliary timing pulses between one of said digital signals and an adjacent pulse on said timing track.

2. A combination as defined in claim 1 wherein the external means comprises a group of cascaded pulse delay units with means for mixing the pulses derived from each delay unit.

3. A combination as defined in claim 1 wherein the external means comprises a plurality of further tracks upon said body each having pulses spaced by the time increment $\Delta T$ and each track having pulses displaced in time from those on another track.

4. A combination as defined in claim 1 wherein the counting means comprises a bistable state flip flop circuit adapted for successive triggering into opposite states by pulses from said timing and digital signal tracks, and a gate circuit connected for priming by said flip flop circuit to pass said auxiliary timing pulses while the flip flop circuit remains in one of its stable states.

5. A combination as defined in claim 4 wherein a further gate circuit is connected to pass said auxiliary timing pulses while the flip flop circuit remains in the other of its stable states.

6. A magnetic recording system as defined in claim 1 wherein said digital signals are of varying pulse duration as compared with the auxiliary timing pulses, and said counting means includes a gating circuit connected to pass said auxiliary timing pulses for the duration of said digital signals.

7. In a multi-track recording system with a record body movable at constant speed having timing signals on one track and digital intelligence signals on another track recorded in time space relationship with the timing signals, the timing signals being pulses separated by a time increment $\Delta T$ approaching the minimum pulse separation definable by the recording system, the improvement comprising, an auxiliary timing pulse generator for providing a plurality of pulses spaced between successive ones of said timing signals, and means responsive to time spacing between the digital and timing signals in said tracks for gating a corresponding number of pulses from said auxiliary generator.

8. A magnetic drum storage system comprising a timing track and a digit track on the drum, timing signals spaced periodically upon the timing track with a minimum pulse spacing approaching that definable by the storage system, digital signals on the digital track each spaced to occur between successively presented timing signals, means reproducing signals from both said tracks, means generating auxiliary timing signals interspersed between timing signals on the timing track, a bistable state flip flop circuit connected to alternately change states responsive to signals from either of said tracks, and a gate primed by said flip flop circuit when in one of the stable states to pass said auxiliary timing signals.

9. A system as defined in claim 8 including a further gate primed by said flip flop circuit when in the other stable state to pass said auxiliary timing signals, whereby pulses from one gate represent a number and signals from the other gate represent its complement.

10. A system as defined in claim 9 including means to preset the flip flop circuit in either state to selectively gate out the recorded number or its complement.

11. A storage system employing a record medium with relatively movable record surface and transducing means, the medium having a pulse definition such as to require at given relative speed a given minimum time spacing between successive recording signals to permit individual reproduction thereof, wherein the medium is provided with a timing track, on which there is recorded timing signal pulses, which timing signal pulses have a periodic recurrence time substantially equal to or greater than the minimum time spacing of the record medium, and a digital signal track in which digit pulses are recorded, each digit pulse being related to one of the timing signal pulses to define an interval of time which is less than the said minimum time spacing and which corresponds to a number of high resolution pulses to be represented by the digit pulses, means for producing the high resolution pulses occurring with the spacing less than that between successive recorded signals, means reproducing electrical timing pulses and electrical digit pulses from the corresponding recorded pulses, and pulsing means responsive to the electrical timing pulses and electrical digit pulses reproduced from the medium by the transducing means to produce a number of the high resolution pulses proportional to said time interval.

References Cited in the file of this patent

UNITED STATES PATENTS

| | | |
|---|---|---|
| 2,540,654 | Cohen et al. | Feb. 6, 1951 |
| 2,564,403 | May | Aug. 14, 1951 |
| 2,597,866 | Gridley | May 27, 1952 |
| 2,656,524 | Gridley et al. | Oct. 20, 1953 |
| 2,680,241 | Gridley | June 1, 1954 |
| 2,730,698 | Daniels | Jan. 10, 1956 |
| 2,740,952 | Jacobs | Apr. 3, 1956 |

OTHER REFERENCES

Harvard Progress Report No. 2, November 1948, Fig. 3, p. II–8.

Text, "High-Speed Computing Devices," McGraw-Hill Book Co., 1950, Figs. 4–5a, p. 46.